June 21, 1960
C. E. RUSCH ET AL
2,941,565
SAFETY TIRE FOR MOTOR VEHICLE WHEELS
Filed June 16, 1959
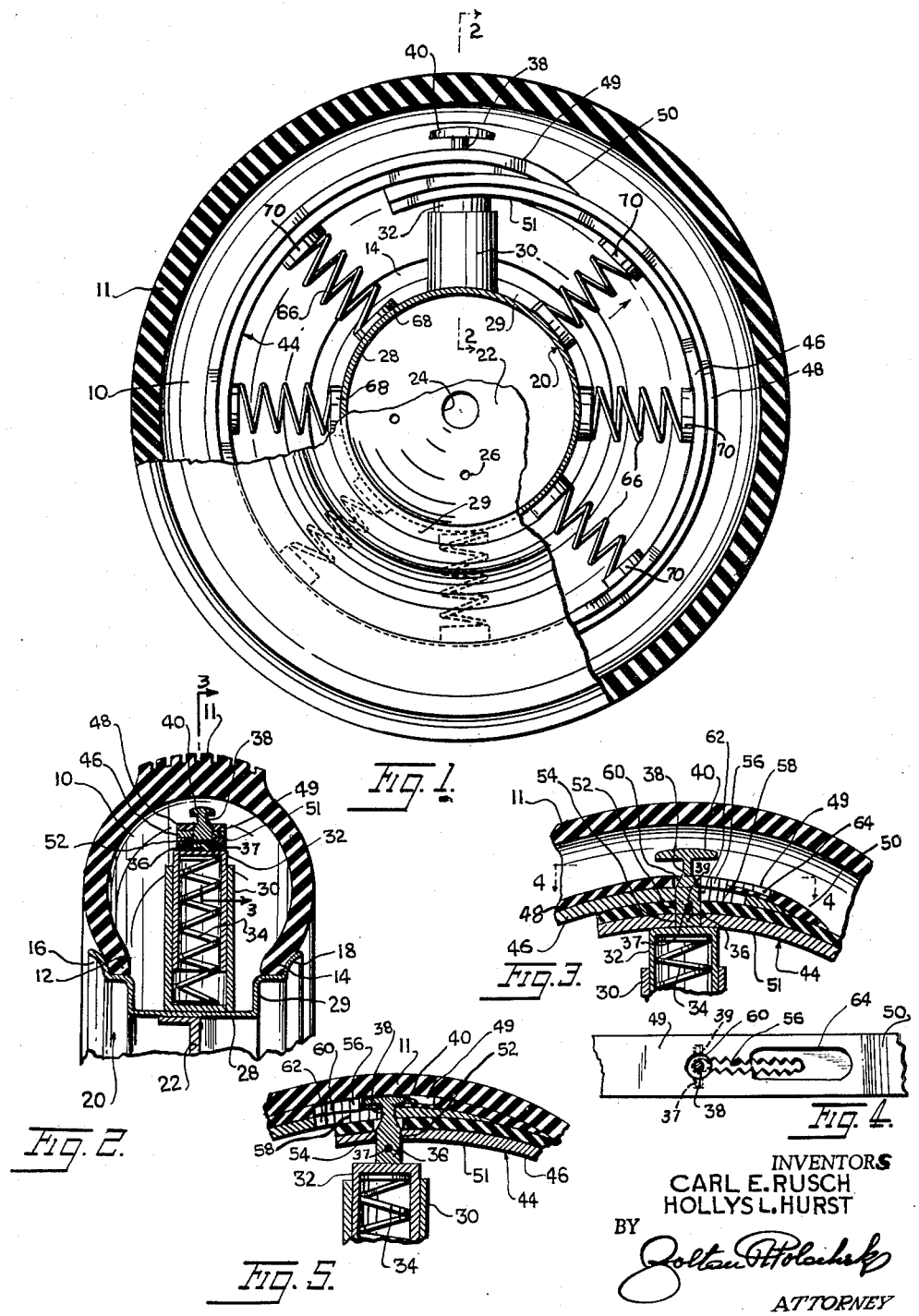
INVENTORS
CARL E. RUSCH
HOLLYS L. HURST
BY
ATTORNEY United States Patent Office 2,941,565
Patented June 21, 1960

2,941,565

SAFETY TIRE FOR MOTOR VEHICLE WHEELS

Carl E. Rusch, 41 Diana Drive, New City, N.Y., and Hollys L. Hurst, 55 1st Ave., Spring Valley, N.Y.

Filed June 16, 1959, Ser. No. 820,761

12 Claims. (Cl. 152—158)

This invention concerns a motor vehicle safety wheel particularly useful in conjunction with a pneumatic, tubeless tire.

Heretofore, the cause of many serious accidents on the highways and byways has been the sudden and unpredictable deflation of one or more of the vehicle pneumatic tires due to punctures or blow-outs when traveling at a high rate of speed. The vehicle operator has a difficult time attempting to maintain control of the vehicle upon the sudden collapse of a tire because of the relative difference in the rolling radii between a properly inflated tire and wheel assembly and a wheel having a deflated tire mounted thereon since there is a definite tendency for the vehicle to pivot on the collapsed tire before the vehicle can be safely brought to a stop. A great deal of thought and effort has been given to the problem of safeguarding the vehicle, cargo, and its passengers during such an eventuality, but much remains to be desired insofar as the results and costs of providing efficient safety devices are concerned. The primary objective of the present invention is the provision of a vehicle wheel and pneumatic, tubeless tire assembly in which the rolling radius is not materially altered upon the sudden loss of air pressure from within the tire to thus mitigate, if not eliminate, the dangers noted above upon the sudden deflation of the tire. The safety tire and wheel assemblies to which the present invention pertains will adequately support the vehicle and prevent the vehicle from swerving from its intended path in the event that a tire should suddenly and without prior warning blow out.

While the present invention is primarily concerned with the safeguarding of life and limb, it is also effective to prevent the destruction of, or injury to the deflated tire which generally occurs during the elapsed time between the moment of blow-out until the vehicle can be brought to rest. Heretofore, when the tire was completely deflated or had an internal pressure less than the normal pressure corresponding to the properly inflated pressure of the tire, the section of the side walls of the tire adjacent to the ground were caused to flex abnormally to thus subject the side walls to the cutting action of the relatively sharp edges of the rim as well as to weaken the bond that holds the various plies of the tire together which ultimately resulted in the irreparable breakage of the ply material. It is, therefore, another object of the present invention to provide a wheel and tire assembly wherein the tire is protected against damage resulting from total or partial deflation which protection never ceases to exist and enables the vehicle to be operated for an indefinite period of time even though one or more of the tires is under inflated.

Still another object of the present invention is the provision of novel vehicle wheels particularly suitable for use with pneumatic tubeless tires which wheel and tire assemblies are readily interchangeable for the conventional ground-engaging wheel and tire assemblies of a motor vehicle and which, when incorporated in a motor vehicle, eliminates the need for stopping the motor vehicle immediately for the purpose of changing a deflated tire. Furthermore, the use of the wheel and tire assemblies of the present invention precludes the necessity of carrying a spare wheel and tire assembly which is costly and requires storage space since, as is well known, tubeless tires are repaired mounted on the vehicle wheel.

Another object is the provision of a simple and efficient safety wheel for supporting a proportional part of the weight of a vehicle equipped therewith in the event the pneumatic tire mounted thereon becomes deflated from punctures, blow-outs or for any other reasons without the tire completely collapsing and includes an annular auxiliary tire which is uniquely attached to the wheel rim upon which the pneumatic tire is mounted and projects inwardly of the tire. The auxiliary tire is mounted on the wheel rim in such a manner so as to afford a radial clearance between the auxiliary tire and the inner surface of the main tire tread when the tire is properly inflated but which engages the inner surface of the tire tread when the tire becomes deflated.

A further object is to provide a vehicle wheel of the drop-center rim type having a safety device incorporated therein which safety device is disposed within the pneumatic tire mounted on the wheel and thus is invisible and does not modify the appearance of the wheel or the vehicle. Furthermore, the safety device will not interfere with normal operation of the vehicle and is made of strong and durable parts which are relatively inexpensive to manufacture and simple to assemble and are relatively damage-free and wear-proof.

A further object is the provision of an auxiliary safety tire provided with spring and latch means whereby the auxiliary tire is held in a retracted position, but is released upon occurrence of an emergency condition such as partial deflation of a tire to provide an emergency rolling support.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a wheel and tire assembly embodying the invention with a portion of the wheel and tire broken away to show internal parts.

Fig. 2 is a sectional view taken on line 2—2 of Fig. 1.

Fig. 3 is a sectional view of a portion of the wheel and tire taken on line 3—3 of Fig. 1.

Fig. 4 is a sectional plan view of a portion of the auxiliary tire taken on line 4—4 of Fig. 3.

Fig. 5 is a view similar to Fig. 3 showing the auxiliary tire in expanded condition.

Referring to the drawings, there is shown a vehicle wheel including a tubeless tire 10 having outer tread 11. The inner annular beads 12 and 14 are engaged in side wall flanges 16 and 18 of a conventional type of drop center rim 20 with depressed wall 28 and side walls 29. The rim carries a central web 22 having a hole 24 for receiving the axle of a vehicle and holes 26 for insertion of bolts to attach the wheel to a brake drum of the vehicle.

In accordance with the invention, mounted on the rim in the annular wall of depressed portion 28 and extending radially outward therefrom there is a cylinder 30. In this cylinder there is slidably mounted a smaller cylinder 32 biased outwardly by a coil spring 34. Attached to the closed top of cylinder 32 there is a post 36. This post is cylindrical in form and has a neck 38 of reduced diameter. An elongated flat or slightly curved head 40 is secured to neck 38. The head extends in a plane perpendicular to the aligned axes of cylinders 30 and 32. A split auxiliary tire 44 is mounted inside the case of tire 10, with its ends overlapping. Post 36 passes through the overlapping ends of the auxiliary tire 44. This tire consists of a metal band 46 covered at its outer side with a resilient rubber layer 48.

The overlapping or outer end 49 of the auxiliary tire 44 tapers or feathers inwardly at 50 and laps the outer surface of cover 48 at the innner end 51 of the tire. Registering holes 52 and 54 are formed in the rubber cover and metal band 46 at the inner end 51 of the tire. A similar pair of registering holes 60 and 62 are formed in the cover 48 and band 46 at the outer end 49 of the tire, the holes 60 and 62 normally registering with the holes 52 and 54. The holes 52, 54, 60, 62 are round and fittingly receive the post 36. The cover 48 and band 46 at the outer end of the tire are formed with narrow slots 56 and 58, respectively, one end of the slots communicating with the holes 60 and 62.

An elongated recess 64 is formed in cover 48. The recess is wider than the slot 56 and communicates therewith, the slot extending to about midway the ends of the recess. The recess is adapted to receive the head 40 of the post 36 when the post is in retracted position as shown in Fig. 5, the base of the recess serving as a seat for the head. In normal extended position, the post 36 extends through the holes 52, 54, 60, 62 in the overlapped ends of the auxiliary tire 44, the neck 38 normally extending outwardly of the cover 48 thereby positioning the head 40 a short distance from the inner surface of the tread 11 of the main tire 10.

The band 46 is formed preferably of spring steel compressed under pressure to split ring shape as shown in Fig. 1, and held by the post 36 which serves as a latching means. Post 36 is urged to latching position by coil spring 34. A plurality of equally spaced coil springs 66 are disposed radially around the rim 20 and are secured between cups 68 mounted on rim 20 and cups 70 secured to the inner side of band 46. The springs 66 are biased outwardly so that they cooperate with the inherent flexibility of band 46 tending to spread the ends 49 and 51 of the auxiliary tire apart. Due to the engagement of the post 36 in the registering holes 52, 54, 60, 62, the ends 49 and 51 of the auxiliary tire 44 are locked in the position shown in Figs. 1–4.

During normal operation of the wheel, the vehicle rides on the tread 11 of the inflated tire 10. The auxiliary tire 44 and its supporting springs form a balanced structure and do not interfere with operation of the wheel and main tire in any way. Should the main tire become punctured, or excessively deflated, it will compress and force the post 36, head 40 and cylinder 32 inwardly. As the parts move inwardly against tension in spring 34, the post is forced inwardly of the overlapped ends 49 and 51 of the auxiliary tire 44 thereby carrying the body of the post out of the holes 60 and 62 in the outer end 49 and bringing the narrow neck 38 of the post into alignment with the narrow slots 56 and 58 of the outer end 49 whereupon the inherent resiliency of the band 46 and cover 48 comes into play, expanding the auxiliary tire and moving the outer end 49 of the auxiliary tire 44 over the inner end 51 until the head 40 becomes lodged in the recess 64 as shown in Fig. 5. The expansion of the auxiliary tire 44 brings rubber cover 48 into contact with the innner side of the tread 11 as indicated in Fig. 5, whereupon the vehicle can continue riding on the deflated main tire and the emergency auxiliary tire for an indefinite period of time until repairs can be made.

A holding pin 37 is provided in the post 36 which projects radially from the outer periphery of the post 36 into slots 39 formed in the lower rubber layer 48 in the hole 52.

When the tire is punctured and the post head 40 is forced inwardly, the projecting ends of the holding pin 37 will be sheared off and the post 36 will be permitted to slide in the position indicated at Figure 5.

Once the auxiliary tire 44 has expanded, it remains locked in this condition until the main tire 10 is removed from rim 20. The tire 44 can then be reset by prying the head 40 radially outward and then exerting a compressive force circumferentially on the tire 44 so that the neck 38 slides in the opposite direction to registering holes 52, 54, 60 and 62 of the compressed auxiliary tire, whereupon spring 34 will force the body of post 36 outwardly into engagement with the walls of holes 60, 62. Due to the flexible mounting of the tire 44 on springs 66, no difficulty will be encountered in removing the tire 10 from the wheel or in remounting it. A conventional bead stretching tool will permit one bead of the tire to be drawn over the auxiliary tire 44 while the main tire is moved axially of rim 20.

Due to the auxiliary tire 44 and the spring mounting thereof, the wheel can be driven for a considerable distance in a safe and comfortable manner. The wheel in this emergency condition will absorb road shocks without damaging the deflated main tire since it is fully supported all around its tread.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A wheel and tire assembly, comprising a pneumatic tubeless tire having a tread portion and side walls terminating in spaced wheel-rim-engaging beads, a drop-center type wheel rim having axially spaced side walls for receiving said tire, annular beads and a central annular depressed portion, a split auxiliary tire disposed within said pneumatic tire and having an outer diameter less than the inner diameter of said tread when the pneumatic tire is inflated, said auxiliary tire having an inner diameter greater than the outer diameter of said central depressed portion, a plurality of springs spaced circumferentially around said wheel rim in said depressed portion and extending radially outward to said auxiliary tire, said auxiliary tire having overlapping ends, and latch means holding the auxiliary tire in a contracted condition, said latch means adapted for release when the tire is deflated to provide expansion of the auxiliary tire and providing an emergency circumferential support for said pneumatic tire.

2. A wheel and tire assembly, comprising a pneumatic tubeless tire having a tread and side walls terminating in spaced wheel-rim-engaging beads, a drop-center type wheel rim having axially spaced side walls for receiving said tire, annular beads and a central annular depressed portion, a split auxiliary tire disposed within said pneumatic tire and having an outer diameter less than the inner diameter of said tread when the pneumatic tire is inflated, said auxiliary tire having an inner diameter greater than the outer diameter of said central depressed portion, a plurality of springs spaced circumferentially around said wheel rim in said depressed portion and extending radially outward to said auxiliary tire, said auxiliary tire having overlapping ends, and latch means holding the auxiliary tire in a contracted condition, said latch means adapted for release when the pneumatic tire is deflated to permit expansion of the auxiliary tire and providing an emergency circumferential support for said pneumatic tire, said auxiliary tire consisting of a flexible metal band and a resilient cover thereover.

3. A wheel and tire assembly, comprising a pneumatic tubeless tire having a tread and side walls terminating in spaced wheel-rim-engaging beads, a drop-center type wheel rim having axially spaced side walls for receiving said tire, annular beads and a central annular depressed portion, a split auxiliary tire disposed within said pneumatic tire and having an outer diameter less than the inner diameter of said tread when the pneumatic tire is inflated, said auxiliary tire having an inner diameter greater than the outer diameter of said central depressed portion, a plurality of springs spaced circumferentially around said wheel rim in said depressed portion and extending radially outward to said auxiliary tire, said tire having overlapping ends, and latch means holding the auxiliary tire in a contracted condition, said latch means adapted for release when the tire is deflated to permit expansion of the auxiliary tire and providing an emergency circumferential support for said pneumatic tire, said latch means comprising a cylindrical post biased radially outward by one of said springs, said post having a restricted portion, the overlapped ends of the auxiliary tire having registering holes fittingly receiving said post in the expanded condition of the auxiliary tire, the overlapping end having a narrow slot communicating with the hole therein adapted to receive the restricted portion of the post in the contracted condition of the auxiliary tire.

4. A wheel and tire assembly, comprising a pneumatic tubeless tire having a tread and side walls terminating in spaced wheel-rim-engaging beads, a drop-center type wheel rim having axially spaced side walls for receiving said tire, annular beads and a central annular depressed portion, a split auxiliary tire disposed within said tire and having an outer diameter less than the inner diameter of said tread when the pneumatic tire is inflated, said auxiliary tire having an inner diameter greater than the outer diameter of said central depressed portion, a plurality of springs spaced circumferentially around said wheel rim in said depressed portion and extending radially outward to said auxiliary tire, said tire having overlapping ends, and latch means holding the auxiliary tire in a contracted condition, said latch means adapted for release when the pneumatic tire is deflated to permit expansion of the auxiliary tire and providing an emergency circumferential support for said pneumatic tire, said latch means comprising a cylindrical post biased radially outward by one of said springs, the overlapped ends of the auxiliary tire having registering holes fittingly receiving said post in the contracted condition of the auxiliary tire, said auxiliary tire consisting of a flexible metal band and a resilient cover thereover, said holes being formed in said band and cover.

5. A wheel and tire assembly, comprising a pneumatic tubeless tire having a tread and side walls terminating in spaced wheel-rim-engaging beads, a drop-center type wheel rim having axially spaced side walls for receiving said tire, annular beads and a central annular depressed portion, a split auxiliary tire disposed within said pneumatic tire and having an outer diameter less than the inner diameter of said tread when the pneumatic tire is inflated, said auxiliary tire having an inner diameter greater than the outer diameter of said central depressed portion, a plurality of springs spaced circumferentially around said wheel rim in said depressed portion and extending radially outward to said auxiliary tire, said tire having overlapping ends, and latch means holding the auxiliary tire in a contracted condition, said latch means adapted for release when the pneumatic tire is deflated to permit expansion of the auxiliary tire and providing an emergency circumferential support for said pneumatic tire, said latch means comprising a cylindrical post biased radially outward by one of said springs, the overlapped ends of the auxiliary tire having registering holes fittingly receiving the post in the contracted condition of the auxiliary tire, the overlapping end of said auxiliary tire having a slot extending from the hole therein, said slot being narrower than said hole, said post having a narrow neck slidably received in said slot.

6. A wheel and tire assembly, comprising a pneumatic tubeless tire having a tread and side walls terminating in spaced wheel-rim-engaging beads, a drop-center type wheel rim having axially spaced side walls for receiving said tire, annular beads and a central annular depressed portion, a split auxiliary tire disposed within said pneumatic tire and having an outer diameter less than the inner diameter of said tread when the tire is inflated, said auxiliary tire having an inner diameter greater than the outer diameter of said central depressed portion, a plurality of springs spaced circumferentially around said wheel rim in said depressed portion and extending radially outward to said auxiliary tire, said tire having overlapping ends, and latch means holding the auxiliary tire in a contracted condition, said latch means being adapted for release when the pneumatic tire is deflated to permit expansion of the auxiliary tire and providing an emergency circumferential support for said pneumatic tire, said latch means comprising a cylindrical post biased radially outward by one of said springs, the overlapped ends of the auxiliary tire having registering holes substantially equal in diameter to the diameter of the post and receiving the post in the contracted condition of the auxiliary tire, said auxiliary tire consisting of a flexible metal band with a resilient cover thereover, said holes being formed in said band and cover, the overlapping end of said auxiliary tire having registering slots in the band and cover extending from the holes therein, said slots being narrower than said holes, said post being formed with a narrow neck equal in diameter to the width of said slots and adapted to slide in the slots while the auxiliary tire is being expanded.

7. A wheel and tire assembly, comprising a pneumatic tubeless tire having a tread and side walls terminating in spaced wheel-rim-engaging beads, a drop-center type wheel rim having axially spaced side walls for receiving said tire, annular beads and a central annular depressed portion, a split auxiliary tire disposed within said pneumatic tire and having an outer diameter less than the inner diameter of said tread when the pneumatic tire is inflated, said auxiliary tire having an inner diameter greater than the outer diameter of said central depressed portion, a plurality of springs spaced circumferentially around said wheel rim in said depressed portion and extending radially outward to said auxiliary tire, said tire having overlapping ends, and latch means holding the auxiliary rim in a contracted condition, said latch means adapted for release when the tire is deflated to permit expansion of the auxiliary tire and providing an emergency circumferential support for said pneumatic tire, said latch means comprising a cylindrical post biased radially outward by one of said springs, the overlapped ends of the auxiliary tire having registering holes substantially equal in diameter to the diameter of the post and receiving the post in the contracted condition of the auxiliary tire, said auxiliary tire consisting of a flexible metal band with a resilient cover thereover, said holes being formed in said band and cover, the overlapping end of said auxiliary tire having registering slots in the band and cover extending from the holes therein, said slots being narrower than said holes, said post being formed with a narrow neck equal in diameter to the width of said slots and adapted to slide in the slots while the auxiliary tire is being expanded, there being a recess formed in said cover at the overlapping end of the auxiliary tire, and an elongated head secured to said neck and adapted to enter said recess when the auxiliary tire is in an expanded condition.

8. A wheel assembly, comprising a first circular wheel rim having an outer annular wall, a plurality of spaced coil springs secured to said wall and extending radially outward therefrom, a split flexible metal band secured to the outer ends of the springs, said band having overlapping ends, and releasable latch means engaging said ends and holding the band in a contracted condition, said latch means comprising a cylindrical post having a neck of reduced diameter and a head on the end of the neck, one of said springs urging the post radially outward, the overlapping ends of the band having aligned holes receiving said post in the contracted condition of the band, there being a slot in the overlapping end of the band extending from the hole therein, said slot being narrower than the hole and adapted to receive said neck slidably to permit expansion of the band, said head normally extending outwardly from the overlapping end of the band in a position to be forced inwardly so that said neck enters said slot.

9. A wheel assembly, comprising a main pneumatic tire, a first circular wheel rim having an outer annular wall, a plurality of spaced coil springs secured to said wall and extending radially outward therefrom, a split flexible metal band secured to the outer ends of the springs, said band having overlapping ends, and releasable latch means engaging said ends and holding the band in a contracted condition, said latch means comprising a cylindrical post having a neck of reduced diameter and a head on the end of the neck, one of said springs urging the post radially outward, the overlapping ends of the band having aligned holes receiving said post in the contracted condition of the band, there being a slot in the overlapping end of the band extending from the hole therein, said slot being narrower than the hole and adapted to receive said neck slidably to permit expansion of the band, said head normally extending outwardly from the overlapping end of the band in a position to be forced inwardly so that said neck enters said slot, and a resilient cover on the band, said band and cover adapted to serve as an auxiliary tire.

10. A wheel assembly, comprising a main pneumatic tire, a first circular wheel rim having an outer annular wall, a plurality of spaced coil springs secured to said wall and extending radially outward therefrom, a split flexible metal band secured to the outer ends of the springs, said band having overlapping ends, and releasable latch means engaging said ends and holding the band in a contracted condition, said latch means comprising a cylindrical post having a neck of reduced diameter and a head on the end of the neck, one of said springs urging the post radially outward, the overlapping ends of the band having aligned holes receiving said post in the contracted condition of the band, there being a slot in the overlapping end of the band extending from the hole therein, said slot being narrower than the hole and adapted to receive said neck slidably to permit expansion of the band, said head normally extending outwardly from the overlapping end of the band in a position to be forced inwardly so that said neck enters said slot, and a resilient cover on the band, said band and cover adapted to serve as an auxiliary tire, said cover having a recess therein for receiving said band when the band is expanded.

11. A wheel and tire assembly, comprising a pneumatic tubeless tire having a tread and side walls terminating in spaced wheel-rim-engaging beads, drop-center type wheel rim having axially spaced side walls for receiving said tire, annular beads and a central annular depressed portion, a split auxiliary tire disposed within said pneumatic tire and having an outer diameter less than the inner diameter of said tread when the pneumatic tire is inflated, said auxiliary tire having an inner diameter greater than the outer diameter of said central depressed portion, a plurality of springs spaced circumferentially around said wheel rim in said depressed portion and extending radially outward to said auxiliary tire, said tire having overlapping ends, and latch means holding the auxiliary tire in a contracted condition, said latch means adapted for release when the pneumatic tire is deflated to permit expansion of the auxiliary tire and providing an emergency circumferential support for said pneumatic tire, said latch means comprising a cylindrical post biased radially outward by one of said springs, the overlapped ends of the auxiliary tire having registering holes fittingly receiving the post in the contracted condition of the auxiliary tire, the overlapping end of said auxiliary tire having a slot extending from the hole therein, said slot being narrower than said hole, said post having a narrow neck slidably received in said slot, a retaining pin extending radially from the said post, for holding the post in normal position.

12. A wheel and tire assembly, comprising a pneumatic tubeless tire having a tread and side walls terminating in space wheel-rim-engaging beads, a drop-center type wheel rim having axially spaced side walls for receiving said tire, annular beads and a central annular depressed portion, a split auxiliary tire disposed within said pneumatic tire and having an outer diameter less than the inner diameter of said tread when the tire is inflated, said auxiliary tire having an inner diameter greater than the outer diameter of said central depressed portion, a plurality of springs spaced circumferentially around said wheel rim in said depressed portion and extending radially outward to said auxiliary tire, said tire having overlapping ends, and latch means holding the auxiliary tire in a contracted condition, said latch means being adapted for release when the pneumatic tire is deflated to permit expansion of the auxiliary tire and providing an emergency circumferential support for said pneumatic tire, said latch means comprising a cylindrical post biased radially outward by one of said springs, the overlapped ends of the auxiliary tire having registering holes substantially equal in diameter to the diameter of the post and receiving the post in the contracted condition of the auxiliary tire, said auxiliary tire consisting of a flexible metal band with a resilient cover thereover, said holes being formed in said band and cover, the overlapping end of said auxiliary tire having registering slots in the band and cover extending from the holes therein, said slots being narrower than said holes, said post being formed with a narrow neck equal in diameter to the width of said slots and adapted to slide in the slots while the auxiliary tire is being expanded, a retaining pin extending radially from the said post for holding the post in normal position, the projecting ends of the said pin engaged in opposed radial slots in the rubber covering of the said auxiliary tire adapted to be sheared off the holding post, when the post is forced inwardly.

References Cited in the file of this patent

UNITED STATES PATENTS

| | | |
|---|---|---|
| 1,295,733 | Gray et al. | Feb. 25, 1919 |
| 2,775,282 | Kennedy | Dec. 25, 1956 |